United States Patent [19]

Phillips

[11] Patent Number: 5,357,698
[45] Date of Patent: Oct. 25, 1994

[54] SNOW BLOWER ATTACHMENT FOR LAWNMOWERS AND METHOD OF CLEARING SNOW

[76] Inventor: Alfred F. Phillips, 3484 Sunheights Dr., Victoria, British Columbia, Canada V9C 3P7

[21] Appl. No.: 145,108

[22] Filed: Nov. 3, 1993

[51] Int. Cl.$^5$ .................. E01H 5/09; A01D 34/73
[52] U.S. Cl. ........................ 37/243; 56/16.9; 56/295
[58] Field of Search ............... 37/241, 242, 243; 56/2, 56/16.9, 295, 255, 17.5

[56] References Cited

U.S. PATENT DOCUMENTS

| | | | |
|---|---|---|---|
| 2,984,919 | 5/1961 | Stoddard | 37/243 |
| 2,991,567 | 7/1961 | Erickson | 37/243 |
| 3,035,359 | 5/1962 | Ewert | 37/243 |
| 3,043,036 | 7/1962 | Trojanek | 37/195 |
| 3,142,913 | 8/1964 | Durrschmidt | 37/243 |
| 3,181,255 | 5/1965 | Stoddard | 37/243 |
| 3,373,514 | 3/1968 | Forren | 37/243 |
| 3,673,776 | 7/1972 | Smith | 56/16.9 |
| 3,724,182 | 4/1973 | Long et al. | 56/10.4 |
| 3,775,878 | 12/1973 | Beckner | 37/233 |
| 3,863,291 | 2/1975 | Woelffer | 15/328 |
| 3,982,337 | 9/1976 | Garriott | 37/233 |
| 4,308,676 | 1/1982 | Doane | 37/243 |
| 4,774,803 | 10/1988 | Kempton | 56/295 |

Primary Examiner—David J. Bagnell
Attorney, Agent, or Firm—Bull, Housser & Tupper

[57] ABSTRACT

An apparatus for clearing snow and other particulate material comprises one or a pair of arms mounted for rotation within the housing of a conventional rotary lawnmower or equivalent, as a substitute for the conventional grass-cutting blade. This enables the lawnmower to be used for clearing snow during the winter, when it cannot be used for cutting grass. The rotatable arm comprises an elongated blade member having upper and lower vanes extending upwardly and downwardly respectively from the blade member. The lower vanes act as knives to cut the snow or material to facilitate removal. The lower vanes are inclined obliquely to the blade axis so as to direct material that is below the blade member inwardly towards the axis of rotation. The upper vanes are inclined obliquely to a blade axis extending radially outwardly from the axis of rotation to direct material above the blade outwardly through a discharge opening of the housing. Inclination of the lower vanes with respect to the blade axis is in an opposite direction to the corresponding inclination of the adjacent upper vanes.

20 Claims, 2 Drawing Sheets

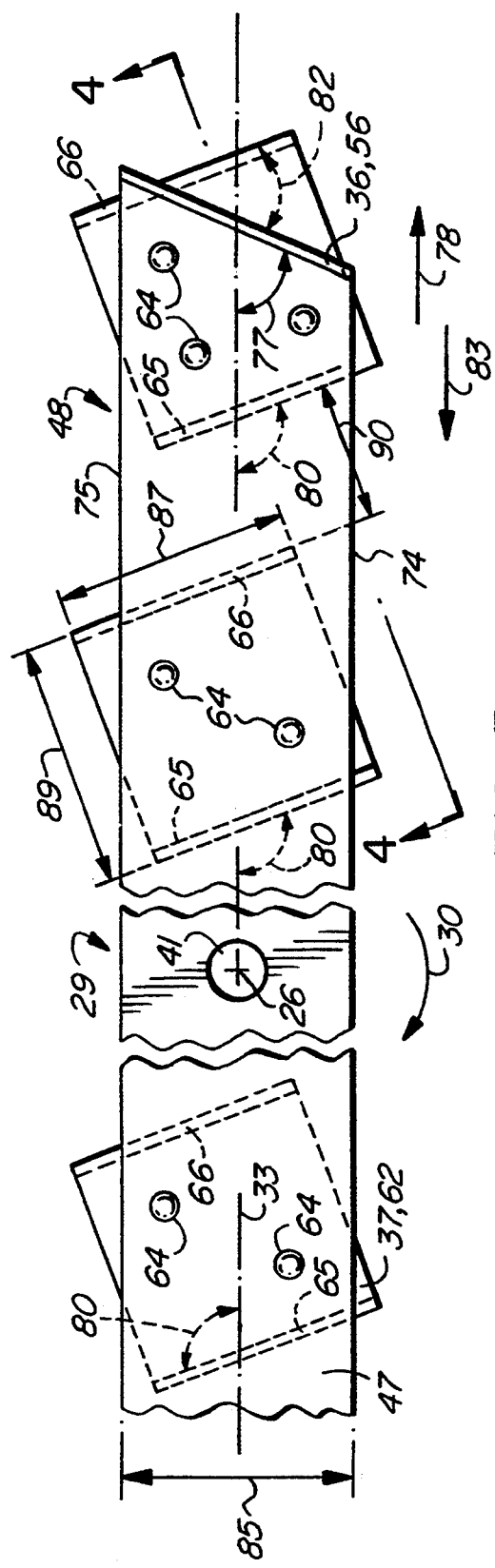
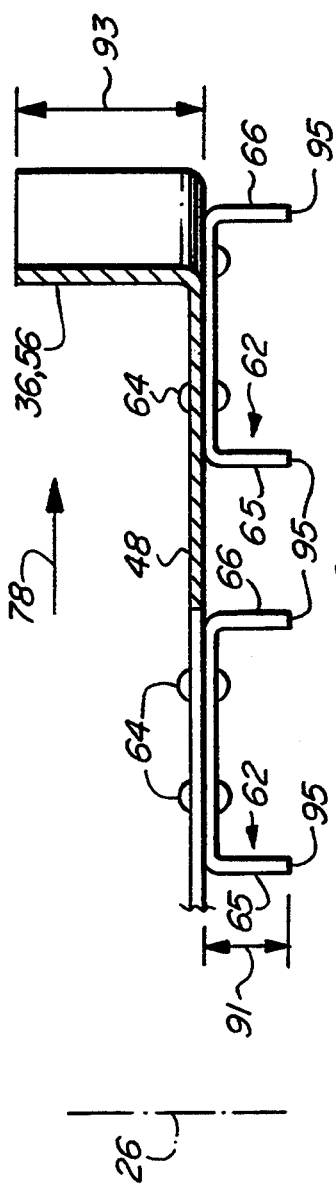
FIG. 3
FIG. 4

SNOW BLOWER ATTACHMENT FOR LAWNMOWERS AND METHOD OF CLEARING SNOW

BACKGROUND OF THE INVENTION

The invention relates to a snow blower attachment for attachment to a conventional rotary lawnmower, particularly for removal of snow and other lightweight particulate materials such as leaves etc.

Snow blower attachments for rotary lawnmowers have been proposed for many years, and can provide an economical snow blower to reduce the work of clearing paths and driveways after a snowfall. Because the lawnmower is not usable during the winter seasons for cutting grass, connecting a snow blower attachment to the lawnmower extends the use of the lawnmower through a period when it would normally be unusable.

Some of the prior art snow blower attachments are designed to be attached to the existing standard cutter blade of the lawnmower, and thus require attachments of relatively small accessories, usually to tips of the blade which can be time consuming as sometimes several nuts and bolts and required for each attachment. Furthermore, if the nuts and bolts are not properly secured, or if there is "lost motion" between the blade and accessories, the accessories can become loosened due to the vibration, and can be thrown from the blade, thus exposing the operator or other persons nearby to risk. Other prior art attachments provide a complete blade or arm which is substituted for the standard cutter blade, and thus eliminates the problem of accidental loss of attachments mounted on the standard blade. Some of these devices are relatively complex and costly to manufacture, and might be prone to damage if they accidentally contact a hard object during use.

Also, some prior art devices require intake or exhaust duct accessories to be fitted to the existing stationary housing surrounding the blade and this requires more work to convert the lawnmower to a snow blower and vice versa. Other devices discharge the snow through an existing grass cuttings discharge opening in the housing which is a more common arrangement. Some prior art blades provide a vertical plate-like pushing device which is designed to push against the snow prior to spinning the snow within the housing of the lawnmower, which spinning eventually forces the snow through the discharge opening. Such devices might operate reasonably well in relatively light snow, but encounter difficulty when the snow has become frozen or partially packed, because a normal lawnmower has insufficient power to break up a large volume of snow. Other types of blades tend to lift or scoop the snow upwardly from its surface, but do not seem to provide a sufficient force to eject the snow through the discharge opening, and thus tend to require a great deal of power for operation. Typical prior art attachments are shown in U.S. Pat. No. 2,984,919 issued to Stoddard; U.S. Pat. No. 2,991,567 issued to Erickson; U.S. Pat. No. 3,043,036 issued to Trojanek and U.S. Pat. No. 3,373,514 issued to Forren.

There appears to be no snow blower attachments for attachment to a rotary lawnmower which are specifically designed to cut harder or packed snow into small portions initially, and then to exert a positive driving force tending to force the small portions of snow outwardly through the discharge opening, thus providing more clearance for recently cut snow to be subsequently ejected through the discharge opening.

SUMMARY OF THE INVENTION

The invention provides a rugged, low cost snowblower attachment for a rotary lawnmower which provides a first structure for initially breaking or cutting the snow into relatively small portions or fragments followed by initial inwards movement, after which the fragmented snow is forcefully ejected outwardly from the lawnmower by a second portion of the attachment.

A rotatable arm for clearing snow and other particulate or fragmented material comprises an elongated blade member, first and second upper vane means, and first and second lower vane means. The elongated blade member has a mounting means located centrally between first and second outer end portions of the blade member. The mounting means is coincident with an axis of rotation of the blade member. The first and second upper vane means extend upwardly from the first and second outer end portions of the blade member respectively. Each upper vane means is inclined obliquely at an upper vane angle to a blade axis extending radially outwardly from the axis of rotation of the blade member. The first and second lower vane means extend downwardly from the first and second outer end portions of the blade member respectively. Each lower vane means is inclined obliquely at a lower vane angle to the blade axis. Inclination of the lower vane means with respect to the blade axis is in an opposite direction to corresponding inclination of the adjacent upper vane means, so that at a particular end portion of the blade member the upper vane means is inclined at a net angle to the lower vane means when viewed along the axis of rotation.

Preferably, each lower vane means comprises at least one vane member inclined at an angle to the direction of rotation of the arm so as to direct material that is below the blade member inwardly towards the axis of rotation of the blade member. Also, each upper vane means is a vane member inclined at an angle to the direction of rotation of the arm so as to direct material that is above the blade member outwardly away from the axis of rotation of the blade member. Preferably, the lower vane angle is between about 110 degrees and 115 degrees, and the upper vane angle is between 50 degrees and 70 degrees, the angles being measured on an inwardly disposed leading side of the blade axis defined with respect to direction of rotation of the blade member. The lower vane means are disposed parallel to each other, and the upper vane means are disposed parallel to each other, when viewed along the axis of rotation of the blade member.

The above described arm member is used for clearing snow and other particulate or fragmented material by installation in an apparatus such as a rotary lawnmower, the apparatus comprising a housing, ground bearing means and a motor. The housing has a top portion and a peripheral rim portion extending downwardly from the top portion to define a downwardly facing recess, the rim portion having a discharge opening. The ground mounting means mounts the housing for movement along the ground, and the motor is mounted on the housing and has an output shaft rotatable within the recess.

The method according to the invention is for clearing snow or other particulate or fragmented material and comprises moving generally vertically disposed lower and upper vane means in generally circular lower and upper arcs respectively about a generally vertical axis of rotation. The lower vane means cut the snow or material and are inclined obliquely to respective tangents to the lower arc to move the cut material inwardly towards the axis. The upper arc is disposed above the lower arc, and the upper vane means are inclined obliquely at respective tangents to the upper arc to move the material outwardly from the axis. Preferably, simultaneously with moving the upper and lower vane means to the respective arcs, the axis of rotation is moved in a feed direction generally normally to the axis of rotation, so as to feed the snow and material into the lower arc. Also, preferably, the axis of rotation is tilted rearwardly in a direction opposite to the feed direction of the axis, so as to incline the arc out of the horizontal plane to facilitate feeding material into the lower arc.

A detailed disclosure following, related to drawings, describes a preferred embodiment of the invention which is capable of expression and structure other than that particularly described and illustrated.

DESCRIPTION OF THE DRAWINGS

FIG. 3 is a simplified fragmented top plan of portions of the attachment showing details of angles of vane means of the lawnmower attachment;

FIG. 4 is a simplified fragmented partial section as seen generally on line 4—4 of FIG. 3.

DETAILED DISCLOSURE

Figure 1:
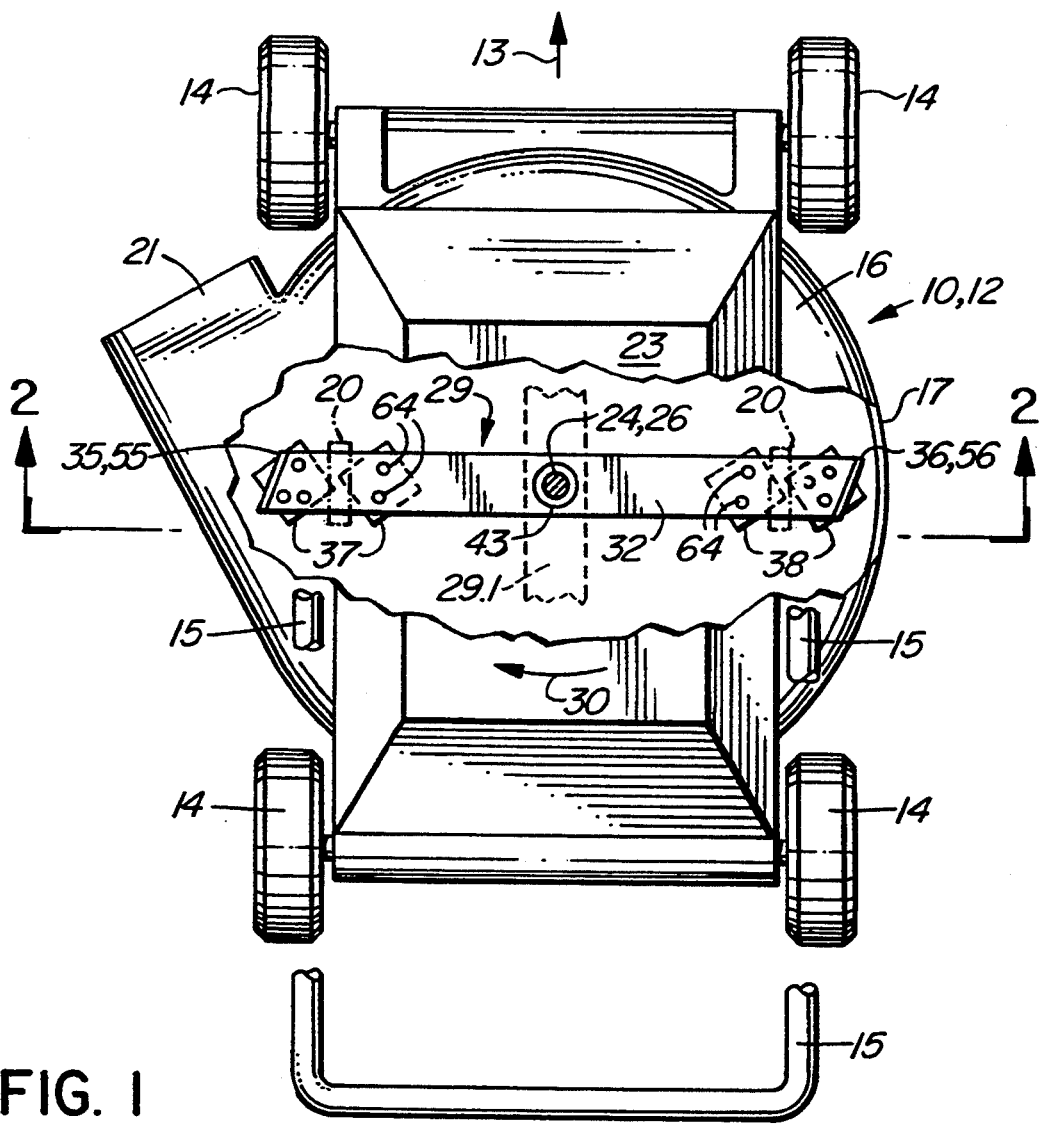
FIG. 1 is a simplified, fragmented top plan view of a lawnmower fitted with a snowblower attachment according to the invention, portions of the lawnmower being removed to show some detail of the attachment.
Figure 2:
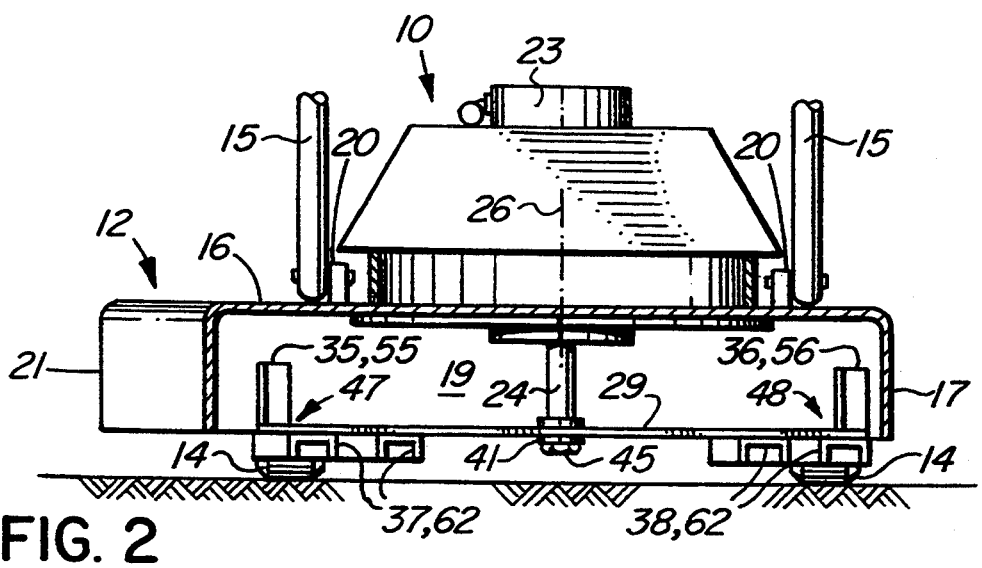
FIG. 2 is a simplified fragmented section on line 2—2 of FIG. 1 showing a side view of the attachment and portions of the lawnmower and adjacent structure.

FIGS. 1 and 2

A conventional lawnmower 10 according to the invention has a housing 12 mounted on four ground bearing wheels 14 which mount the housing for movement along the ground. A handle 15, only partially shown, is hinged to the housing for moving the lawnmower as is well-known. Preferably, the handle is hinged centrally on the housing 12, i.e. to brackets 20 located on a transverse diameter of the housing, so that the lawnmower can be pushed in a forward or feed direction, per an arrow 13, which is the preferred direction of feed as will be described. The housing has a top portion 16 and a peripheral rim portion 17 extending downwardly from the top portion to define a downwardly facing recess 19. The rim portion has a discharge opening 21 adapted to pass grass cuttings from the recess out to a collecting bag, or to fall on the ground. For use as a snowblower, the discharge opening 21 is best directed forwardly and laterally away from the operator, and in addition is directed slightly upwardly which improves throw of the apparatus. The upwards discharge can be attained primarily by adjusting the wheels 14 as will be described. The forward direction of discharge of snow is opposite to that commonly found on prior art lawnmowers, which usually discharge cut grass clippings rearwardly and laterally generally towards the operator. To facilitate or increase the upwards discharge of snow through the opening 21, the handle 15 or the hinge brackets 20 have stops, not shown, which limit swinging of the handle with respect to the housing. In this way, the operator can increase height of the forward portion of the lawnmower by lifting the upper pair of wheels from the snow, so that most of the weight is carried on the rear wheels closely adjacent the operator. While this technique can be used with lawnmowers with the discharge opening directed rearwardly, it results in a downward discharge from the housing, which is contrary to the best use of the present invention.

A motor 23 is mounted on the top portion of the housing and has an output shaft 24 passing into the housing so as to be rotatable within the recess about an output shaft axis 26. The lawnmower usually has a cutting blade member, not shown, mounted securely at an outer or lower end of the shaft 24, the blade member having sharp edges along leading edges of the blade member, so as to cut grass which is then discharged through the opening 21. However, for the present invention, the usual cutting blade member is removed and an alternative rotatable arm member 29 according to the invention is substituted. The rotatable arm 29 is rotatable per arrow 30 about the axis 26 and is for clearing snow and other particulate or fragmented material, such as dried leaves, grass clippings etc. which usually can be removed more easily than by using other conventional methods.

The rotatable arm member 29 comprises an elongated blade member 32, first and second upper vane means 35 and 36 respectively, and first and second lower vane means 37 and 38 respectively. The elongated blade member has a central opening 41 to receive the outer end of the shaft 24. Most of the blade member is an essentially straight, generally flat strip having a longitudinal blade axis 33 extending from the axis of rotation 26 of the output shaft and blade member. The blade member is retained between a shoulder means 43 and a large washer and nut combination 45 adjacent the outer end of the shaft 24. The central opening 41 serves as a mounting means located centrally between first and second outer end portions 47 and 48 of the blade member and is clearly coincident with an axis of rotation of the blade member, which in turn is coincident with the output shaft axis 26. Clearly, other means are available for attaching the blade member to the shaft and are not disclosed. Also, while one arm member 29 is described, a second essentially identical arm member, shown partially and in broken outline at 29.1 in FIG. 1, can be fitted at right angles to the first member 29 to improve efficiency, without a significant increase in power requirements.

The first and second upper vane means 35 and 36 extend upwardly from the first and second outer end portions of the blade member respectively. In this particular embodiment, the upper vane means 35 and 36 are integral with the outer end portions 47 and 48 of the blade member which are bent upwardly generally perpendicularly to the flat strip of the blade member to form upwardly extending first and second upper vane members 55 and 56. The vane members 55 and 56 are parallel to each other when viewed along the axis 26 (FIG. 1) and have faces disposed generally parallel to the axis of rotation 26 of the blade member when viewed laterally (FIG. 2). In addition, as will be described with reference to FIGS. 3 and 4, the vane members 55 and 56 are inclined equally and obliquely to the blade axis 33. Thus, each vane member is inclined obliquely to the direction of rotation of the arm, i.e. to the arrow 30, so as to direct material outwardly away from the axis 26 as will be described. As also seen in FIG. 2, the upper vane members 55 and 56 are aligned generally horizontally with the discharge opening 21.

As will also be described with reference to FIGS. 3 and 4, the lower vane means 37 and 38 each have a pair of generally similar inverted U-shaped, right-angled channel members, severally 62, which are secured by fasteners 64, e.g. rivets, at similar oblique angles to the axis 33 to respective outer end portions 47 and 48 of the blade member.

FIGS. 3 and 4

As structural details adjacent the outer end portions of the arm member 29 are essentially similar, the second outer end portion 48 only will be described in detail.

Each channel member 62 has inner and outer parallel lower vane portions 65 and 66 which extend perpendicularly downwardly as shown in FIG. 4 to provide a pair of parallel faces of lower vane members. Each channel member is secured to the respective outer end portion so that the lower vane members are inclined obliquely at equal angles to the blade axis 33, as will be described in greater detail with reference to FIG. 3.

As previously stated, the arm member 29 rotates about the axis 26 in direction of the arrow 30, and thus a leading edge 74 of the blade member 32 adjacent the outer end portion 48 is on one side of the blade axis 33, and a trailing edge 75 is on an opposite side of the blade axis. With reference to FIG. 3, for simplicity, all angular measurements with respect to the angles of inclination of the vane members are made with respect to the blade axis 33, on a leading edge side of the blade member, and on the side of the vane member disposed inwardly towards the axis 26. Thus, the second upper vane member 56 is inclined obliquely at an upper vane angle 77 to the blade axis 33, the vane angle being measured on an inwardly disposed leading side of the blade axis defined with respect to direction of rotation of the blade member, per the arrow 30. The angle 77 is shown at about 70 degrees, and is preferably between about 70 degrees and 55 degrees, but in some instances can be between about 70 and 50 degrees. As previously stated, the upper vane member 56 is inclined at an angle to the direction of rotation of the arm member 29 so as to direct or move material that is above the blade member outwardly per the arrow 78 away from the axis of rotation 26 of the blade member.

Similarly, the lower vane members, i.e. the vane portions 65 and 66, are each inclined at a lower vane angle 80 as measured on an inwardly disposed leading edge side of the blade axis defined with respect to direction of rotation of the blade member. Thus, all the lower vane means are disposed generally parallel to each other when viewed along the axis of rotation 26 in FIG. 3. It can be seen that each outer portion of the blade members has four parallel vane faces disposed generally parallel to the axis of rotation 26 of the blade member when viewed laterally in FIG. 4. The vane portions of each channel member 62 extending below the first and second outer end portions of the blade member provide the first and second lower vane means 37 and 38 which are inclined obliquely to the direction of rotation so as to direct material that is below the blade member inwardly towards the axis of rotation of the blade member.

The lower vane angle 80 is disclosed as approximately 115 degrees, but can be between about 100 degrees and 120 degrees for a normal range. It can be seen that the inclination of the lower vane means with respect to the blade axis 33 is in an opposite direction to the corresponding inclination of the adjacent upper vane means. In this way, at a particular end portion of the blade member, i.e. the end portion 48 as shown, the upper vane means is inclined at a net angle 82 to the lower vane means when viewed along the axis of rotation 26. Therefore, the net angle 82 can be between about 30 degrees and 70 degrees but is shown as about 45 degrees. As previously stated, the lower vane members 65 and 66 are inclined to direct or move material that is below the blade member inwardly per an arrow 83 towards the axis of rotation 26 of the blade member, and thus move material in an opposite direction to the arrow 78, i.e. opposite to direction of movement of material that is above the blade member. Clearly, both the upper and lower vane means are inclined obliquely to respective tangents of arc swept by the vane means, the tangents not being shown.

The blade member 32 can be manufactured from a strip of sheet steel having a thickness of approximately 1.5 mm (0.06 ins.), and a width 85 of approximately 50 mm (2.0 ins.). For convenience of manufacturing, the U-shaped channel members 62 can be fabricated from a strip of material of similar width to the blade member, and thus would have a length 87 of about 50 mm (2.0 ins.), and a width 89 as measured between the inner and outer lower vane portions 65 and 66 of also approximately 50 mm (2.0 ins.). Spacing 90 between adjacent vane portions of two adjacent channel members at a particular end portion is somewhat less than the spacing between vane portions of a particular channel member, i.e. the width 89, although this is noncritical. To provide adequate clearance from the ground when clearing snow of depths sufficient for removal, the vane portions of the channel members extend downwardly to a depth 91 approximately 20 mm–25 mm (0.8–1.0 ins.) from the blade member. The upper vane members act as a discharge fan, and to provide adequate force, the upper vane member should extend upwardly to a height 93 approximately 40 mm (1.5 ins.) from the blade member.

Clearly, radial spacings of the respective vane means from the axis 33 are equal on each side of the axis 26 to maintain dynamic balance of the arm member 29. Also, the lower vane means have a maximum radius generally equal to radius of the upper vane means, and thus the upper and lower arcs have generally similar radii. Also, clearly the upper and lower vane means rotate together as they extend from the same blade member.

OPERATION

The conventional grass-cutting blade, not shown, is removed by unscrewing the nut and washer combination 45 at the lower end of the output shaft 24, and the rotatable arm member 29 according to the invention is fitted in its place. When installing, care must be taken to ensure that the lower vane means, which are shorter and more numerous than the upper vane means are installed to face downwardly towards the ground. If the depth of snow is between 0 and 100 mm (4.0 ins.), it is usual to adjust the wheels, to attain a relative height of between about 8.0 mm and 20.0 mm (3.2 ins. and 0.8 ins.) between forward and rear wheels of the mower so that the front portion of the housing 12, and thus the discharge opening 21 is as high as practical, and the rear portion is as low as practical. This causes the discharge opening 21 to be inclined upwardly and forwardly and away the operator to improve discharge of snow from the apparatus as previously mentioned. In this way, the housing is inclined upwardly forwardly, that is, that a leading portion of the housing 12 is spaced higher above the ground than a trailing portion of the housing, as the lawnmower is moved by the handle 12 in the normal forward feed direction per the arrow 13. In this way, the snow is fed more easily into the open front of the lawnmower, enabling it to be first cut by the lower vane means as the blade rotates. If the snow is exceptionally deep, the adjustment of the wheels may be insufficient to accommodate the greater depth of snow, and in these circumstances, it would be prudent to apply some downward force on the handle 15 against the stops so as to raise the forward portion of the mower even higher than that attained with the wheel height difference. Thus, inclining the housing 12 upwardly forwardly results in the axis of rotation 26 being tilted rearwardly, assuming the lawnmower is moved in the normal feed direction per arrow 13. When the lawnmower is operating, the axis of rotation is moved in the forward or feed direction generally normally to the axis of rotation so as to feed the snow or material into a lower arc of rotation generated by the lower vane means. Thus, the method also includes tilting the axis of rotation rearwardly in a direction opposite to the feed direction of the axis, so as to incline the arc of rotation of the vane means out of a horizontal plane to facilitate feeding of material into the lower arc of rotation.

The following description assumes that the snow is powdery, wet, slightly crusty, or lightly packed so as to be consolidated, without being ice. In general, use of the mower is appropriate only in situations where the snow can be easily cut by the lower vane means without severely reducing speed of rotation as the mower is advanced into the snow. Particles or fragments of snow cut by rotating the lower vane means are moved inwardly per the arrow 83 towards the axis 26 due to forces from the lower vane means and air flow generated by the angles of inclination of the lower vane means. The inward movement of snow particles towards the axis 26 provides clearance for the lower vane means as they advance into the snow, thus reducing tendency of the snow to clog or restrict the lower vane means at the outer ends of the blade.

In contrast, rotation of the arm and angles of inclination of the upper vane means generates a generally outwardly directed air flow through the discharge opening 21, which generates relatively low pressure above the blade member adjacent the axis 26. Consequently, snow pushed towards the axis 26 below the blade member is then influenced by a pressure differential between the upper and lower faces of the blade member. The particles or fragments of snow are drawn upwardly and then come under the influence of the upper vane means, which provide an outwards directed force of the particles which results in the particles of snow being blown outwardly and upwardly through the discharge opening 21 of the housing.

Thus, the effectiveness of the present invention is attributed to at least two separate airflow actions described above, which result from the net angle 82 between the upper and lower vane means. Clearly, analysis of air flow within the housing is complex, and the description of the flow is idealized and simplified and based on the inventor's interpretation. The sets of vanes disposed at the net angle appear to generate a pressure difference between the upper and lower surfaces of the blade member, and between the axis 26 and the outer end portions 47 and 48. Pressure beneath the blade member appears to be higher at the axis 26 due to an air entrainment effect of the lower vane means, which pressure difference is then reversed by the upper vane means. In addition, prior to moving the snow inwardly to the axis, the snow usually requires fragmenting from the body of snow lying on the ground. Thus, the invention can be summarized as first cutting the snow into fragments, generating an inwards force to draw the snow fragments inwardly beneath the blade towards the axis of rotation, drawing the snow fragments upwardly, and finally, followed by discharging the snow disposed above the blade member axially outwardly from the housing.

The method according to the invention can also be summarized as comprising the following steps. Moving a generally vertically disposed lower vane means in a generally circular lower arc about a generally vertical axis of rotation to cut the snow or material, the vane being inclined obliquely to a tangent of the lower arc to move the cut material inwardly towards the axis 26. In addition, the method comprises moving a generally vertically disposed upper vane means in a generally circular upper arc disposed above the lower arc about the said axis, the upper vane means being inclined obliquely at a tangent to the upper arc to move the material outwardly away from the axis.

From the above it can be seen that the lower vane means act as knives to cut the snow, and simultaneously generate an inwards force to move the snow inwardly to the axis, whereas the upper vane means serve more as fan blades to generate an outwardly directed force on the fragmented snow to discharge it through the opening. Clearly, the lower vane means are likely to unintentionally contact hard surfaces during use. They are therefore designed to be rugged, low cost and easy to replace if necessary. The whole arm member is a low cost and rugged unit when compared with some devices of the prior art.

ALTERNATIVES

In the embodiment described, the upper vane means are produced by bending outer end portions of the blade member upwardly at the tips, and the lower vane means are produced by securing inverted U-shaped channel members to the blade member. This is to provide a greater number of cutting edges on the lower surface of the blade member, than "fan blades" on the upper surface of the blade member. This is to ensure that particles of snow are cut or fragmented as finely as possible by the plurality of cutting edges, so as to facilitate removal of the snow by the fan blades. As previously stated, the alternative second arm member 29.1 (see FIG. 1) can be included with the arm member 29 to not only increase the number of cutting edges, but also to increase the number of upper vane means to enhance air flow and discharge of snow from the housing.

For compacted snow, or snow with a light "crust", performance is improved by providing serrations 95 (FIG. 4) on lower edges of the vanes 65 and 66, which serrations assist in breaking up the surface of the snow to facilitate removal. Preferably, the serrations are of a depth and pitch similar to that found in a common handsaw for cutting wood, and thus can be of the order of between 4 and 10 teeth per inch. The serrations are shown in an end view only and can be symmetrical.

I claim:

1. A rotatable arm for clearing snow and other particulate or fragmented material, the arm comprising:

(a) an elongated blade member having a mounting means located centrally between first and second outer end portions of the blade member, the mounting means being coincident with an axis of rotation of the blade member;

(b) first and second upper vane means extending upwardly from the first and second outer end portions of the blade member respectively, each upper vane means being inclined obliquely at an upper vane angle to a blade axis extending radially outwardly from the axis of rotation of the blade member; and (c) first and second lower vane means extending downwardly from the first and second outer end portions of the blade member respectively, each lower vane means being inclined obliquely at a lower vane angle to the blade axis, inclination of the lower vane means with respect to the blade axis being in an opposite direction to corresponding inclination of the adjacent upper vane means, so that at a particular end portion of the blade member, the upper vane means is inclined at a net angle to the lower vane means when viewed along the axis of rotation.

2. A rotatable arm as claimed in claim 1 in which:
(a) each lower vane means comprises at least one vane member inclined at an angle to the direction of rotation of the arm so as to direct the material that is below the blade member inwardly toward the axis of rotation of the blade member.

3. A rotatable arm as claimed in claim 2 in which:
(a) each upper vane means is a vane member inclined at an angle to the direction of rotation of the arm so as to direct material that is above the blade member outwardly away from the axis of rotation of the blade member.

4. A rotatable arm as claimed in claim 1 in which:
(a) the lower vane angle is between about 110 and 115 degrees, as measured on an inwardly disposed leading side of the blade axis defined with respect to direction of rotation of the blade member,
(b) the first and second lower vane means are disposed parallel to each other when viewed along the axis of rotation of the blade member.

5. A rotatable arm as claimed in claim 1 in which:
(a) the upper vane angle is between about 55 degrees and 70 degrees, as measured on an inwardly disposed leading side of the blade axis defined with respect to direction of rotation of the blade member;
(b) the first and second upper vane means are disposed parallel to each other when viewed along the axis of rotation of the blade member.

6. A rotatable arm as claimed in claim 1 in which:
(a) at least some of the vane means have faces disposed generally parallel to the axis of rotation of the blade member.

7. A rotatable arm as claimed in claim 1 in which:
(a) at least some of the vane means have faces disposed generally perpendicularly to a plane containing a main face of the blade member.

8. A rotatable arm as claimed in claim 1 in which:
(a) at least two of the vane means are generally U-shaped channel members secured to respective end portions of the blade member to provide a pair of parallel faces adjacent each said end portion.

9. A rotatable arm as claimed in claim 8 in which:

(a) each lower vane means comprises one of said channel members secured to the respective outer end portion of the blade member to provide multiple cutting edges.

10. A rotatable arm as claimed in claim 1 in which:
(a) the blade member is an essentially straight, generally flat strip having a longitudinal blade axis extending from the axis of rotation,
(b) the lower vane means provide a plurality of generally vertically disposed cutting edges,
(c) the upper vane means provide a plurality of fan blades to discharge air outwardly from the axis of rotation.

11. A rotatable arm as claimed in claim 10 in which:
(a) the outer end portions of the blade member are bent generally perpendicularly to the flat strip along respective bend axes disposed obliquely to the blade axis to form one set of first and second vane means.

12. An apparatus for clearing snow and other particulate material, the apparatus comprising:
(a) a housing having a top portion and a peripheral rim portion extending downwardly from the top portion to define a downwardly facing recess, the rim portion having a discharge opening;
(b) ground bearing means mounting the housing for movement along the ground;
(c) a motor mounted on the housing and having an output shaft rotatable within the recess;
(d) an elongated blade member having mounting means located centrally between first and second outer end portions of the blade member, the mounting means mounting the blade member on the output shaft for rotation about an axis of rotation of the blade member and the motor within the recess;
(e) first and second upper vane means extending upwardly from the first and second outer end portions of the blade member respectively, each upper vane means being inclined obliquely at an upper vane angle to a blade axis extending radially outwardly from the axis of rotation of the blade member;
(f) first and second lower vane means extending downwardly from the first and second outer end portions of the blade member respectively, each lower vane means being inclined obliquely at a lower vane angle to the blade axis, inclination of the lower vane means with respect to the blade axis being in an opposite direction to corresponding inclination of the adjacent upper vane means, so that at a particular end portion of the blade member the upper vane means is inclined at a net angle to the lower vane means when viewed along the axis of rotation.

13. An apparatus as claimed in claim 12 in which:
(a) each lower vane means comprises at least one vane member inclined at an angle to the direction of rotation of the blade member so as to direct the material that is below the blade member inwardly toward the axis of rotation of the blade member.

14. An apparatus as claimed in claim 13 in which:
(a) each upper vane means is a vane member inclined at an angle to the direction of rotation of the blade member so as to direct material that is above the blade member outwardly away from the axis of rotation of the blade member.

15. An apparatus as claimed in claim 12 in which:

(a) the lower vane angle is between about 100 and 120 degrees, as measured on an inwardly disposed leading side of the blade axis defined with respect to direction of rotation of the blade member, (b) the first and second lower vane means are disposed parallel to each other when viewed along the axis of rotation of the blade member.

16. An apparatus as claimed in claim 12 in which:

(a) the upper vane angle is between about 70 degrees and 50 degrees, as measured on an inwardly disposed leading side of the blade axis defined with respect to direction of rotation of the blade member;

(b) the first and second upper vane means are disposed parallel to each other when viewed along the axis of rotation of the blade member.

17. A method of clearing snow or other particulate or fragmented material, the method comprising the steps of:

(a) moving generally vertically disposed lower vane means in a circular lower arc about a generally vertical axis of rotation to cut the snow or material, the lower vane means being inclined obliquely to respective tangents to the lower arc to move the cut material inwardly towards the axis;

(b) moving generally vertically disposed upper vane means in a circular upper arc disposed above the lower arc about the said axis, the upper vane means being inclined obliquely to respective tangents to the upper arc to move the material outwardly away from the axis.

18. A method as claimed in claim 17 further characterized by:

(a) simultaneously with moving the upper and lower vane means through respective arcs, moving the axis of rotation in a feed direction generally normally to the axis of rotation, so as to feed the snow or material into the lower arc.

19. A method as claimed in claim 18 further including:

(a) tilting the axis of rotation rearwardly in a direction opposite to the feed direction of the axis, so as to incline the arc out of a horizontal plane to facilitate feeding material into the lower arc.

20. A method as claimed in claim 17 in which:

(a) the upper and lower arcs have generally similar radii, and (b) the lower and upper vane means rotate together.

* * * * *